United States Patent [19]

Lim

[11] Patent Number: 5,820,089
[45] Date of Patent: Oct. 13, 1998

[54] FURNITURE LEG AND METHOD

[75] Inventor: Kok Jit Lim, Greensboro, N.C.

[73] Assignee: S.V. International Corporation, Greensboro, N.C.

[21] Appl. No.: 909,862

[22] Filed: Aug. 11, 1997

[51] Int. Cl.[6] .................................................. A47B 91/00
[52] U.S. Cl. .................. 248/188.8; 248/188; 248/188.4; 403/205
[58] Field of Search ................................. 248/188, 188.8, 248/188.1, 188.3, 188.4; 108/150, 153; 403/205, 231, 403, 257; 52/258, 260

[56] References Cited

U.S. PATENT DOCUMENTS

| | | | |
|---|---|---|---|
| 1,834,507 | 12/1931 | Tarbox et al. ........................... | 403/258 |
| 3,516,633 | 6/1970 | Blackwood ............................. | 248/188 |
| 4,549,711 | 10/1985 | Giltnane ................................. | 248/188 |
| 5,203,528 | 4/1993 | Oke ....................................... | 248/188.4 |
| 5,641,139 | 6/1997 | Miller et al. ........................... | 248/188 |

Primary Examiner—Leslie A. Braun
Assistant Examiner—Kimberly Wood

[57] ABSTRACT

A furniture leg includes a depression on the furniture leg's upper surface. The depression is designed to compress as the furniture leg is tightened against a furniture frame which prevents the leg from rotating. A method for assembly which includes attaching the furniture leg to a furniture piece is also included.

18 Claims, 4 Drawing Sheets

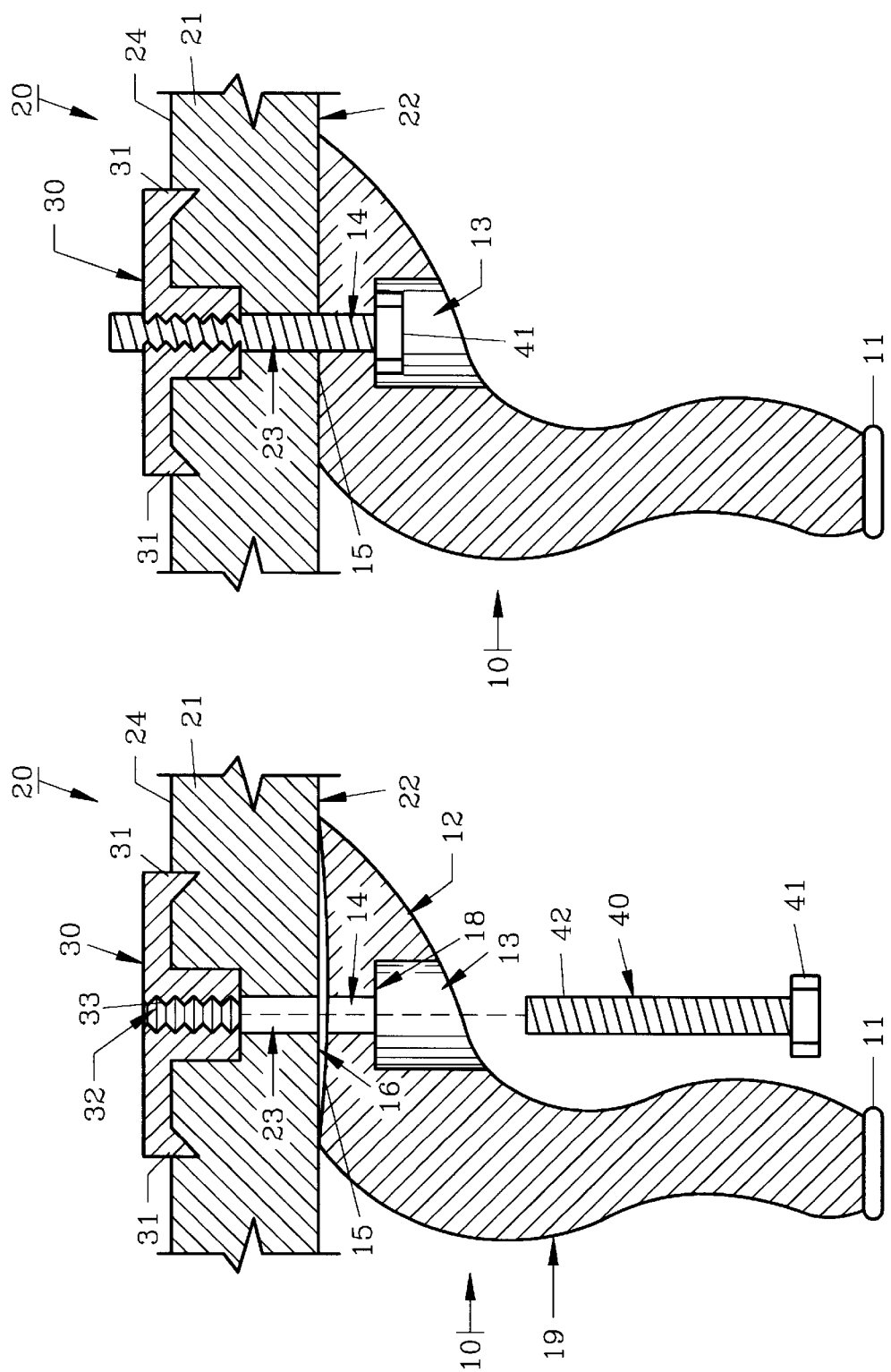

FURNITURE LEG AND METHOD

BACKGROUND OF THE INVENTION

1. Field of the Invention

The invention herein pertains to furniture leg construction and a method of attaching the leg during furniture assembly.

2. Description of the Prior Art and Objectives of the Invention

It is common in the furniture industry to order legs separately from outside manufacturers. These legs typically have a flat upper surface which lies flush against the frame of the piece of furniture and is then attached thereto by a single bolt. These legs are notorious for rotating during attachment to the piece of furniture and numerous efforts have been made to attempt to correct this problem. The first solution was to include extra screws which provide three points of attachment between the piece of furniture and the leg, namely the bolt and two screws. This solution caused the furniture manufacturer to incur extra labor costs. The next solution provided furniture legs such as seen in U.S. Pat. No. 5,641,139 which included raised teeth which piercingly engaged the frame of the furniture. However, exposed teeth and sharp points on screws as described present unexpected problems as they frequently snag and tear upholstery. Likewise, the unwary installer may impale fingers or palms of hands if the installer is careless in his handling of an unattached furniture leg. As exposed teeth and screws on unattached furniture legs are often formed from metal and hence susceptible to rust, careless handling may cause infections or other health problems to furniture factory workers or consumers. Other problems also arise in the manufacturing of such furniture legs. Specifically, extra labor is required to put velcro, screws or teeth on a molded or formed leg after it is removed from the mold, which in turn increases the unit costs.

Thus, with the problems associated with the manufacture and assembly of prior art furniture legs, the present invention was conceived and it is an object herein to provide an improved furniture leg for chairs or the like which eliminates the need for excess or special attaching components such as stabilizing teeth, corrugated fasteners, hook and loop fasteners or the like.

It is a further object of the invention to reduce extraneous labor in the molding of plastic furniture legs.

It is another object of the invention to create a unitary furniture leg which will not rotate relative to a furniture piece when it is tightened there against during assembly.

It is yet another object of the invention to provide a furniture leg with a compressible depression on its upper surface.

It is still a further object of the invention to provide a furniture leg with auxiliary bores for screws or bolts for additional attachment of the furniture leg to the furniture piece.

It is still another object of the invention to provide a furniture leg which eliminates the risk of damaging upholstery during attachment.

It is a further object of the invention to provide a method for attaching such a furniture leg to a chair or the like.

It is yet a further object of the invention to provide a furniture leg in combination with a chair or other furniture wherein inadvertent rotation therebetween is eliminated during assembly.

Still further objects and advantages of the invention will become readily apparent to those skilled in the art to which the invention pertains upon reference to the following detailed description.

SUMMARY OF THE INVENTION

This invention provides a molded furniture leg having a depression on its flexible upper surface, said depression being compressible to a planar or substantially planar surface relative to its original state. During assembly, when tightened against a chair frame as the depression is distorted, rotation is prevented between the furniture leg and the chair frame thereby maintaining it in its proper aligned position. Apertures are provided in the leg upper surface for a bolt and/or screws to attach the leg to the chair frame. A method for properly attaching a leg with a compressible depression to a furniture piece is also presented. In the preferred embodiment, the leg is made of a polymeric or plastic material such as polypropylene or polystyrene, but could be made out of other suitable rigid, compressible materials. The preferred method utilizes the polymeric leg during attachment to a chair frame.

BRIEF DESCRIPTION OF THE DRAWINGS

FIG. 1 shows a cross sectional view of a front furniture leg in initial contact with a furniture piece with the leg as seen before securement;

FIG. 2 illustrates the front furniture leg of FIG. 1 after attachment with the depression compressed and removed;

DETAILED DESCRIPTION OF THE PREFERRED EMBODIMENT AND OPERATION OF THE INVENTION

Figure 4:
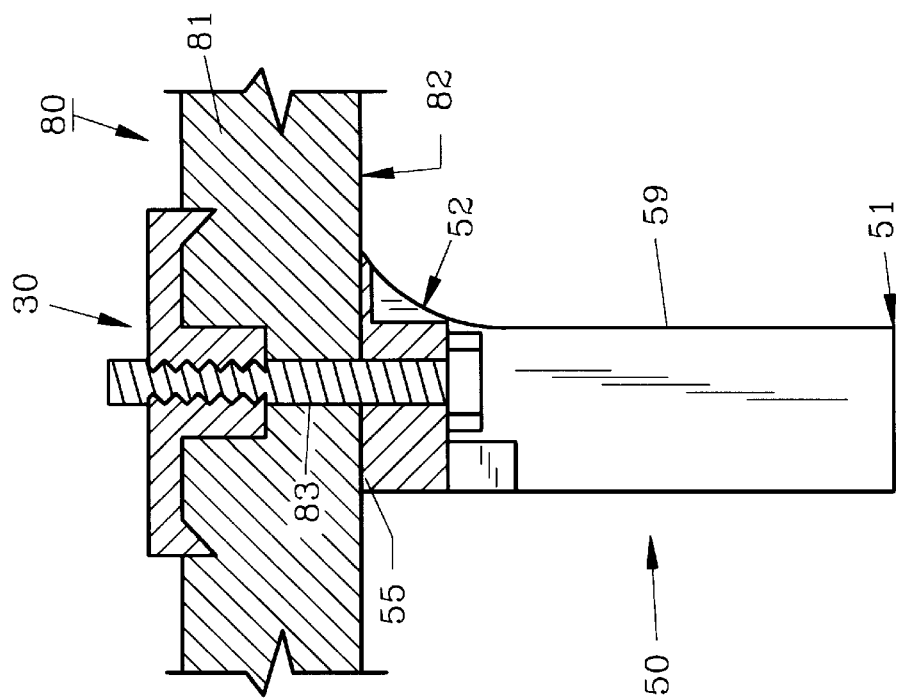
FIG. 4 depicts the chair leg of FIG. 3 attached to the chair frame with the depression compressed and removed.

Turning now to the drawings, FIG. 1 shows a cross sectional view of preferred front furniture leg 10 formed from polypropylene placed against furniture piece 20 which may be a wooden frame of a chair. Front furniture leg 10 has elongated portion 19 with foot 11 and head 12 on opposite ends of elongated portion 19. Head 12 defines cavity 13 sized to receive threaded portion 42 and head 41 of bolt 40. Cavity 13 has shoulder 18 designed to support bolt head 41 and prevent it from passing into bore 14. Bore 14 extends from cavity 13 to upper surface 15 of head 12. Upper surface 15 defines generally conically shaped depression 16 when furniture leg 10 is not tightly attached to furniture piece 20 by bolt 40.

Furniture piece 20 is comprised of frame 21 (shown in fragmented view) with underside surface 22. Bore 23 passes through frame 21. Standard t-nut 30 is affixed to upper surface 24 of frame 21. Teeth 31 of t-nut 30 bite into and piercingly engage upper surface 24 while channel 32 with threads 33 passes through t-nut 30 and is contiguous to bore 23 of frame 21.

As can be seen in FIG. 2, threaded shank 42 of bolt 40 passes through bore 14, bore 23 and then threads into t-nut 30 while cavity 13 receives head 41. When tightened into t-nut 30, bolt 40 causes depression 16 to compress into a flat or planar state so that upper surface 15 of head 12 now rests flush against underside surface 22 of frame 21. Herein, "to compress" means to distort the original shape of the depressed upper surface into a generally planar or flat disposition, thereby increasing the area of frictional engagement between the abutting surfaces 15 and 22 as shown in FIGS. 1 and 2. As noted above, furniture leg 10 is made from a substantially rigid, but deformable, non-brittle material, preferably plastic such as polypropylene or polystyrene so that such compression is possible.

Figure 3:
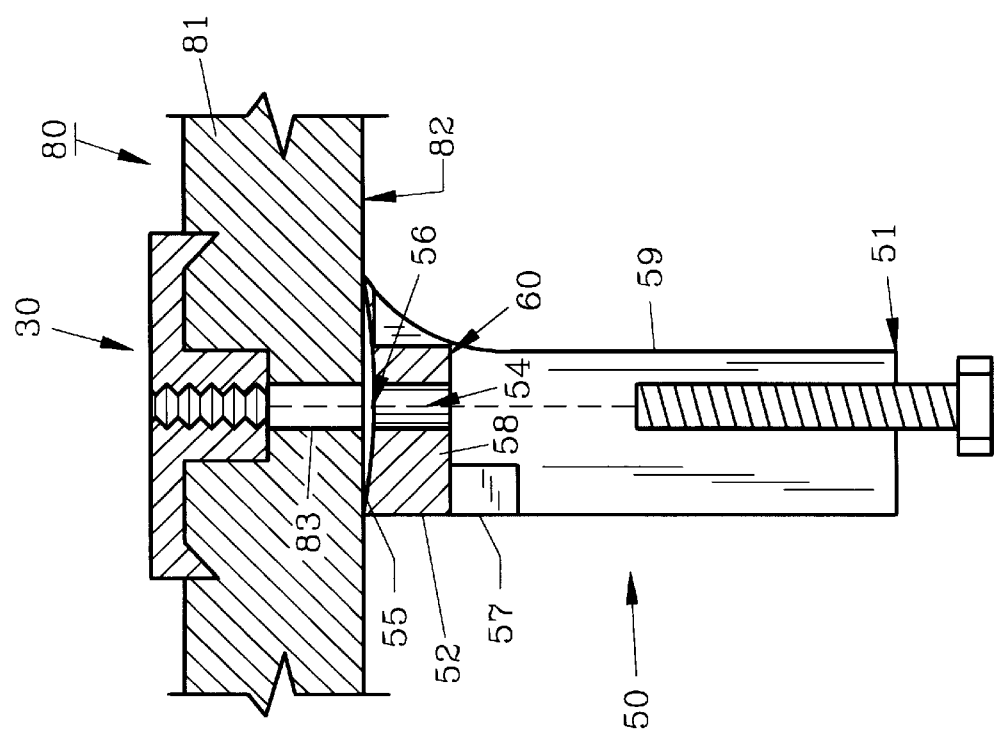
FIG. 3 demonstrates a rear chair leg placed against a chair frame prior to attachment thereto.

FIG. 3 illustrates back chair leg 50 placed next to chair frame 80. Back chair leg 50 includes foot 51 and head 52. Head 52 provides bore 54 and upper surface 55 which defines generally conically shaped cavity 56. Head 52 also includes ledge 57 and decorative member 58 which strengthen head 52 and add ornateness to elongated portion 59. Bolt 40 is positioned in bore 54 and bore 83 and threads into t-nut 30 (FIG. 4) while engaging lip 60 as similarly described in FIG. 2. Bolt 40 compresses cavity 56 in FIG. 4 and upper surface 55 of back leg 50 to flush engage underside surface 82 of frame 81. During initial tightening of bolt 40, leg 50 is stabilized by edge 61 (FIGS. 5 and 7) and will not rotate relative to surface 82.

Figure 5:
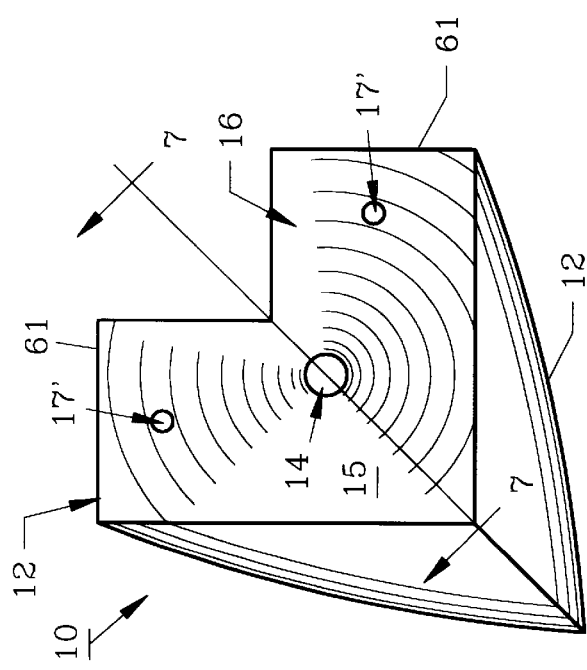
FIG. 5 pictures a top view of the furniture leg of FIG. 1 removed from the furniture piece.

In FIG. 5, a top view of front furniture leg 10 is depicted. Head 12 has upper surface 15 surrounded by outer edge 61. Upper surface 15 in turn defines generally conically shaped depression 16 as detailed above. Bore 14 passes through head 12 near the center of upper surface 15. Auxiliary bores 17 and 17' defined by head 12 are intended to receive additional threaded members (not shown) such as screws as is conventional to increase the strength of the attachment between leg 10 and frame 21 (FIG. 1).

Figure 6:
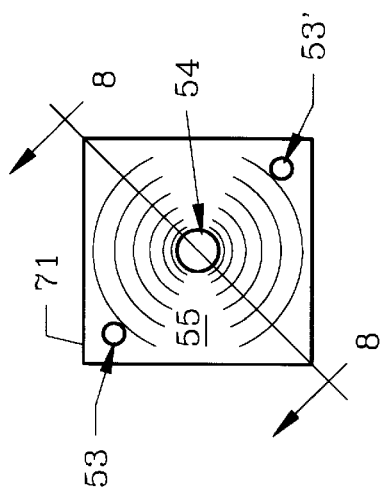
FIG. 6 features a top view of the rear chair leg of FIG. 3.

A top view of back furniture leg 50 is featured in FIG. 6. Upper surface 55 is surrounded by outer edge 71 and is pierced by bore 54 and auxiliary bores 53 and 53' in much the same manner that upper surface 15 is pierced by bores 14, 17 and 17' as shown in FIG. 5. Upper surface 55 defines generally conically shaped depression 56 which is deformable upon tightening as indicated above.

Figure 8:
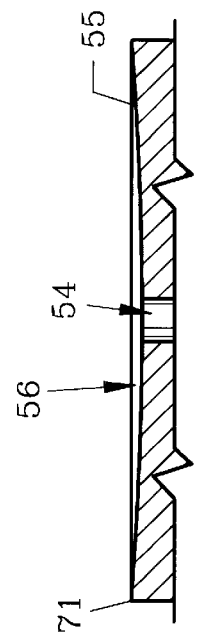
FIG. 8 illustrates an enlarged, partial cross sectional view along line 8—8 of FIG. 6 with the depression therein exaggerated for clarity.
Figure 7:
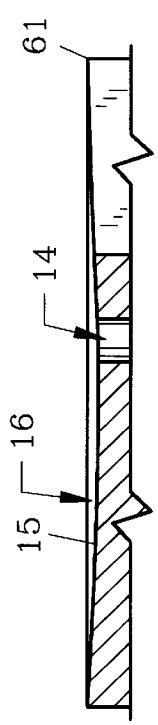
FIG. 7 shows an enlarged, partial cross sectional view along line 7—7 of FIG. 5 with the depression therein exaggerated for clarity.

In FIG. 7, an enlarged partial cross section view of front furniture leg 10 is shown. Specifically, depression 16 is slightly exaggerated to expose the conical nature of depression 16. Likewise, in FIG. 8, an enlarged partial cross section view of back furniture leg 50 is shown with depression 56 slightly exaggerated for clarity. It should be understood that while depressions 16 and 56 are generally conically shaped in the preferred embodiment, other shaped depressions are within the scope of the present invention. The critical feature of such a depression is its ability to compress against the underside of a piece of furniture in such a manner as to distort the depression from its depressed state to a generally planar surface that lies flush with the underside of the piece of furniture.

Figure 9:
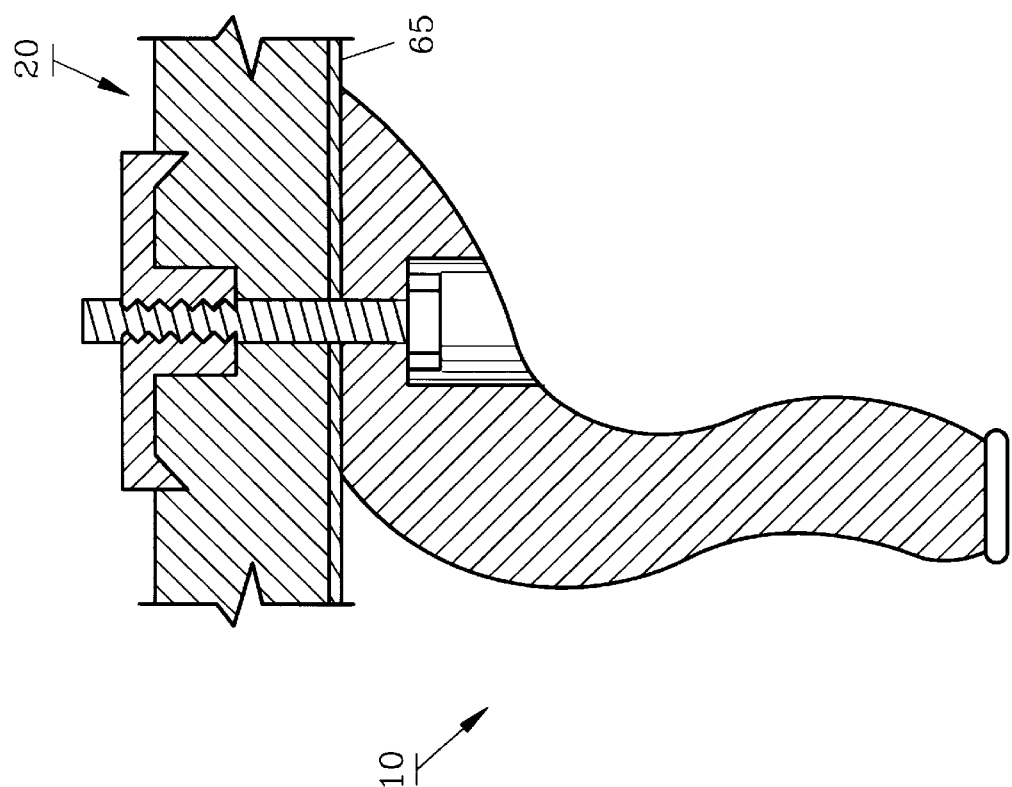
FIG. 9 demonstrates the furniture leg of FIG. 1 attached to a furniture piece with upholstery fabric therebetween.

FIG. 9 shows a furniture leg 10 attached to furniture piece 20 with piece of upholstery 65 disposed therebetween. It is conventional for furniture piece 20 to be upholstered prior to attaching furniture leg 10 and therefore when furniture leg 10 is attached piece of upholstery 65 will be therebetween as is understood by those skilled in the art.

In the preferred method of assembly, furniture leg 10 as seen in FIG. 1 is placed against frame 21 while underside 22 is exposed, as when furniture piece 20 is inverted. Bolt 40 is placed in cavity 13 and slides into bore 14, bore 23 and engages threads 33 of t-nut 30. Upper surface 15 defines generally conically shaped depression 16 between upper surface 15 and underside surface 22. As bolt 40 is tightened into t-nut 30, bolt head 41 engages lip 18 and shortens the distance between lip 18 and underside 22. This tightening flexes upper surface 15 of leg 10 and compresses or deforms depression 16 in upper surface 15 until upper surface 15 is substantially planar and flush with underside surface 22 as seen in FIG. 2. In this manner, outer edge 61 of upper surface 15 holds front furniture leg 10 against frame 21 in such a manner that leg 10 will not rotate relative to frame 21. It is to be understood that while front furniture leg 10 is described, it is equally desirable to use this preferred method on back furniture leg 50.

Additional threaded members (not shown) can be placed in auxiliary bores 17 and 17' to further affix leg 10 to frame 21. This step is conventionally used in furniture assembly.

It should be noted that depressions 16 and 56 are not necessarily conically shaped, but such are preferred. Other, more abruptly shaped depression transitions are clearly contemplated within the scope of the present invention. Likewise, the particular shapes of the legs are not limited by the above recitation and examples.

I claim:

1. A unitary furniture leg comprising an elongated portion, one end of said elongated portion defining a compressible substantially concave depression; and whereby said concave depression is adapted to prevent rotation of said furniture leg relative to a furniture piece when assembled thereto.

2. The furniture leg as claimed in claim 1 and further comprising a head, said head attached to said elongated portion.

3. The furniture leg as claimed in claim 2 wherein said head defines a bore.

4. The furniture leg as claimed in claim 3 wherein said bore is adapted to receive a threaded member.

5. The furniture leg as claimed in claim 1 wherein said leg is plastic.

6. The furniture leg as claimed in claim 2 and wherein said head defines a plurality of bores.

7. The furniture leg as claimed in claim 6 wherein each of said plurality of bores is adapted to receive a threaded member.

8. The furniture leg as claimed in claim 1 wherein said depression is generally conically shaped.

9. In combination, a) a furniture piece; and b) a unitary leg, said leg having:

I) an elongated portion, and ii) a head, said head attached to said elongated portion, and said head defining a compressible substantially concave depression, said head attached to said furniture piece; and whereby said concave depression is adapted to prevent rotation of said furniture leg relative to a furniture piece when assembled thereto.

10. The combination as claimed in claim 9 wherein said furniture piece further comprises a layer of upholstery disposed thereon.

11. The combination as claimed in claim 9 wherein said head defines a bore, said bore adapted to receive a threaded member, said bore contained within said depression.

12. The combination as claimed in claim 11 further comprising a threaded member, said threaded member received in said bore and attached to said furniture piece.

13. The combination as claimed in claim 9 wherein said leg further comprises a foot, said foot attached to said elongated portion and spaced from said head.

14. The combination as claimed in claim 9 wherein said leg is polymeric.

15. The combination as claimed in claim 9 wherein said depression is generally conically shaped.

16. A method for attaching a furniture unitary leg having a compressible substantially concave depression on its upper surface to a flat surface of a furniture frame, said method comprising the steps of:

a) positioning the upper surface of the leg against the flat surface of the furniture frame;

b) forcing the upper surface against the frame flat surface;

c) compressing the depression to prevent the furniture leg from rotation relative to the frame; and d) securing the furniture leg to the furniture frame while the depression remains compressed; and whereby said compression depression is adapted to prevent rotation of said furniture leg relative to a furniture piece when assembled thereto.

17. The method as claimed in claim 16 wherein the step of affixing the furniture leg to the furniture frame comprises tightening a threaded member.

18. The method as claimed in claim 16 wherein the step of compressing the depression comprises deforming the depression to a flattened state.

\* \* \* \* \*